US012545228B2

(12) United States Patent
Allen et al.

(10) Patent No.: US 12,545,228 B2
(45) Date of Patent: Feb. 10, 2026

(54) SYSTEM AND METHOD FOR SHIFTING A TRANSMISSION (71) Applicant: Dana Heavy Vehicle Systems Group, LLC, Maumee, OH (US)

(72) Inventors: James Allen, Atherstone (GB); Jordan M. Houser, Sylvania, OH (US); Jared Reichert, Maumee, OH (US); Darren J. Ziskovsky, Bowling Green, OH (US); Jeffrey M. David, Cedar Park, TX (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 326 days.

(21) Appl. No.: 17/931,412

(22) Filed: Sep. 12, 2022

(65) Prior Publication Data
US 2023/0099191 A1 Mar. 30, 2023

Related U.S. Application Data (60) Provisional application No. 63/261,824, filed on Sep. 29, 2021.

(51) Int. Cl.
*B60W 10/08* (2006.01)
*B60W 10/02* (2006.01)
*B60W 30/19* (2012.01)

(52) U.S. Cl.
CPC ............ *B60W 10/08* (2013.01); *B60W 10/02* (2013.01); *B60W 30/19* (2013.01); *B60W 2510/107* (2013.01); *B60W 2540/10* (2013.01); *B60W 2710/022* (2013.01); *B60W 2710/083* (2013.01)

(58) Field of Classification Search
CPC ...... B60W 10/08; B60W 10/02; B60W 30/19; B60W 2510/107; B60W 2710/022; B60W 2710/083
USPC .......................................................... 701/22
See application file for complete search history.

(56) References Cited

U.S. PATENT DOCUMENTS

2007/0205735 A1* 9/2007 Kiuchi ............ B60W 30/18127
318/432
2020/0361303 A1* 11/2020 Meyer ...................... B60K 1/02
2020/0391723 A1* 12/2020 Syed ..................... B60W 20/40

* cited by examiner

*Primary Examiner* — Adnan M Mirza
(74) *Attorney, Agent, or Firm* — McCoy Russell LLP (57) ABSTRACT A method and system for shifting a transmission that includes one or more mechanical clutches without clutch plates is described. In one example, a torque output of an electric machine is adjusted in response to a request to shift a transmission so that forces that hold the mechanical clutch in an engaged position may be reduced.

16 Claims, 5 Drawing Sheets

SYSTEM AND METHOD FOR SHIFTING A TRANSMISSION

CROSS REFERENCE TO RELATED APPLICATION

The present application claims priority to U.S. Provisional Application No. 63/261,824, entitled "SYSTEM AND METHOD FOR SHIFTING A TRANSMISSION", and filed on Sep. 29, 2021. The entire contents of the above-listed application are hereby incorporated by reference for all purposes.

TECHNICAL FIELD

The present disclosure relates to a system and method for shifting a transmission of a vehicle. The vehicle may include mechanical clutches for shifting between gears of the transmission.

BACKGROUND AND SUMMARY

A vehicle may include a transmission that includes one or more mechanically operated clutches for shifting between the transmissions gears. The mechanical clutch may be configured as a synchronizer or curvic coupler that allows a portion of the mechanical clutch to rotate with a shaft of the transmission. The mechanical clutch may also include teeth or protrusions that allow the mechanical clutch to engage features of a freely rotating transmission gear so that the transmission gear may be locked to rotate with a transmission shaft. The mechanical clutch may be held in an engaged state (e.g., locking a gear to a transmission shaft) by forces that act on the mechanical clutch when the clutch is transferring torque. The forces acting on the clutch to keep the clutch engaged may be related to the geometry of clutch and the force being transferred through the clutch. However, the forces that keep the transmission clutch engaged with the gear may be so strong that they may prevent an actuator from unlocking the clutch to facilitate shifting of the transmission. Therefore, it may be desirable to provide a way of reducing forces acting on the clutch to keep the clutch engaged when a gear shift is requested.

The inventors herein have recognized the above-mentioned issues and have developed a method for shifting a transmission, comprising: adjusting a torque of an electric machine responsive to a driver demand via a controller while not shifting a gear of the transmission; and adjusting the torque of the electric machine via the controller responsive to a gear shift request, the torque adjusted according to a torque map that reduces forces that act to keep a clutch engaged to a gear in response to the gear shift request.

By adjusting a torque of an electric machine to a torque that is a function of vehicle speed, a transmission temperature, and transmission break-in effects, it may be possible to provide the technical result of reducing forces that hold a clutch in an engaged state so that a transmission may be shifted from a first gear to a second gear. In one example, the torque of the electric machine may be adjusted responsive to upshift and downshift maps that are functions of vehicle speed, transmission temperature, and transmission break-in effects.

The present description may provide several advantages. In particular, the system and method described herein may allow a smaller actuator to adjust a position of a clutch to shift gears. A smaller actuator may reduce system cost, packaging dimensions, and system weight. In addition, the present approach may be applied to upshifts and downshifts.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
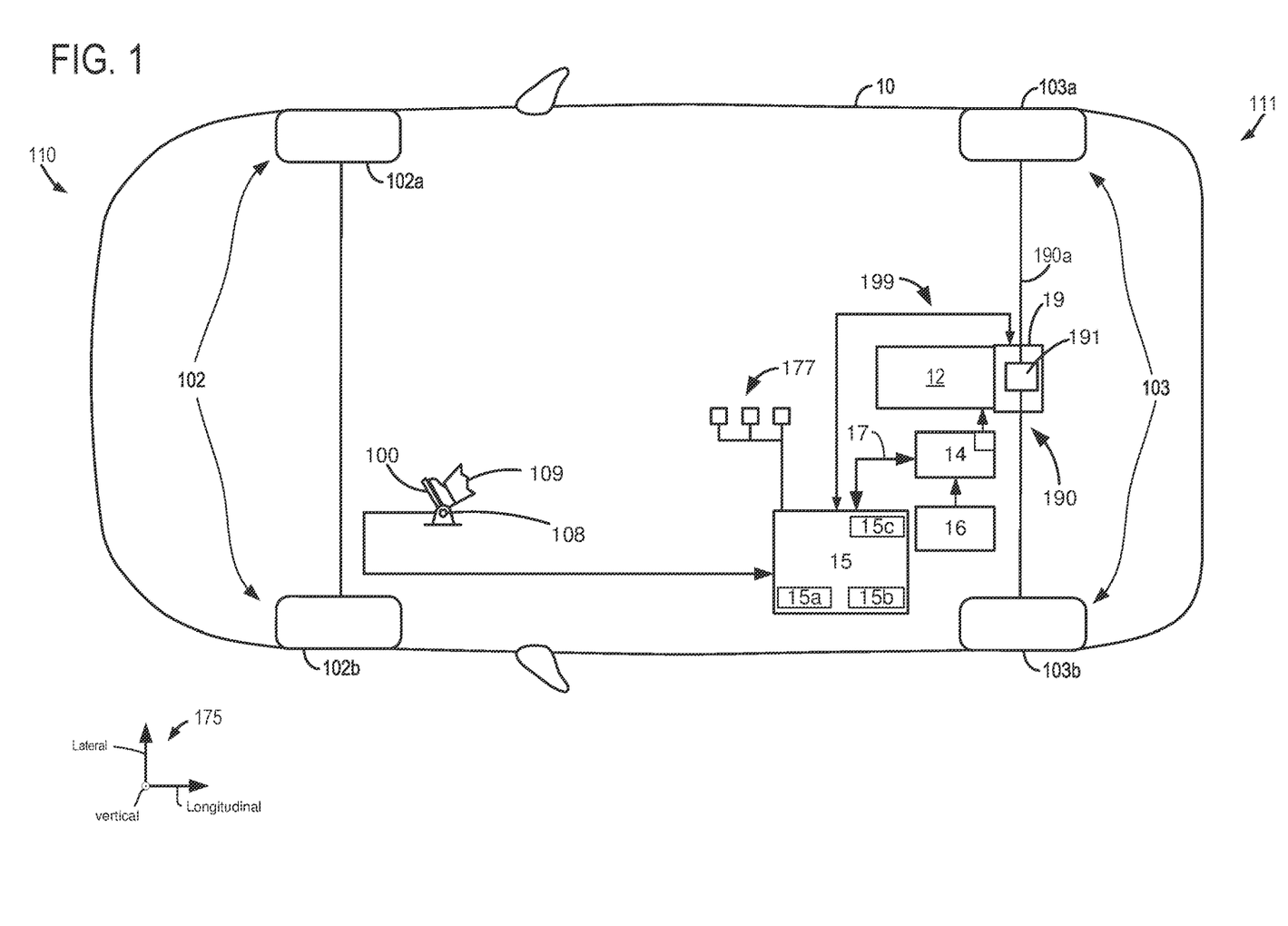
FIG. 1 is a schematic diagram of an example vehicle driveline that includes an electric machine and a transmission.
Figure 2:
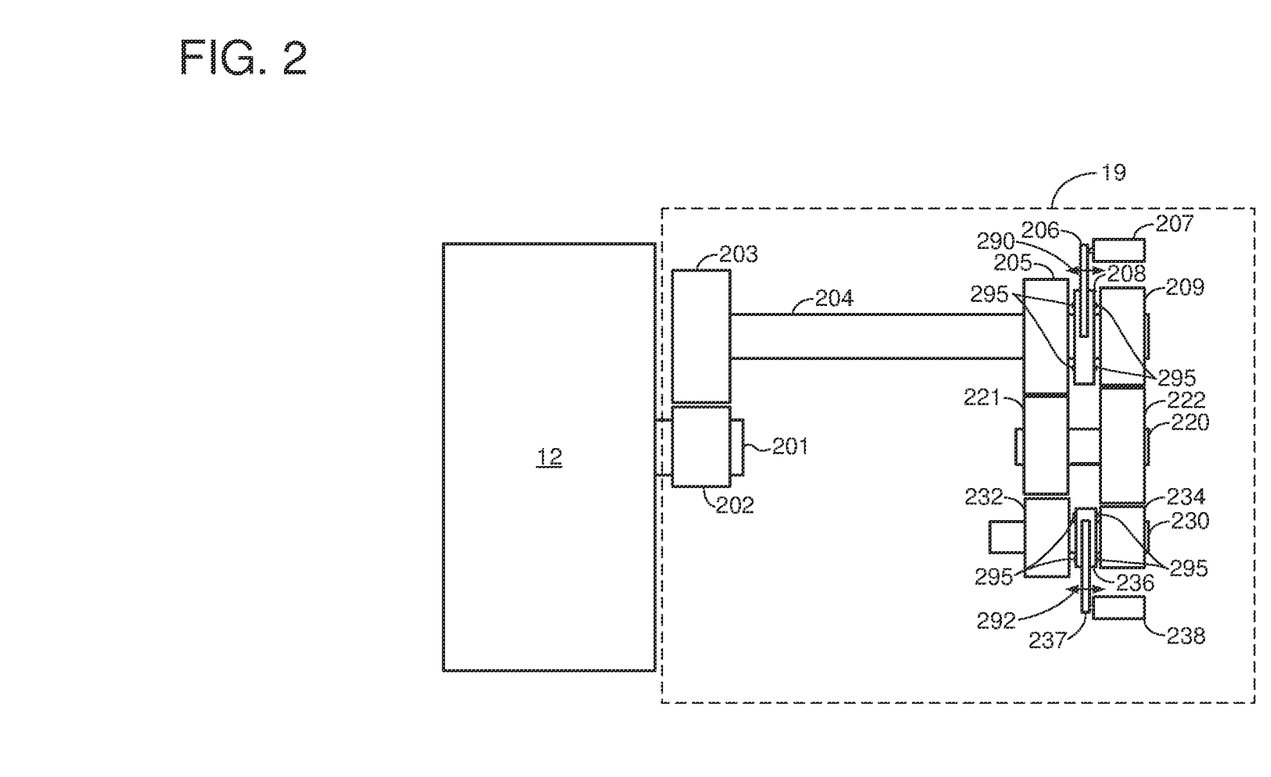
FIG. 2 a schematic view of an example transmission.
Figure 3:
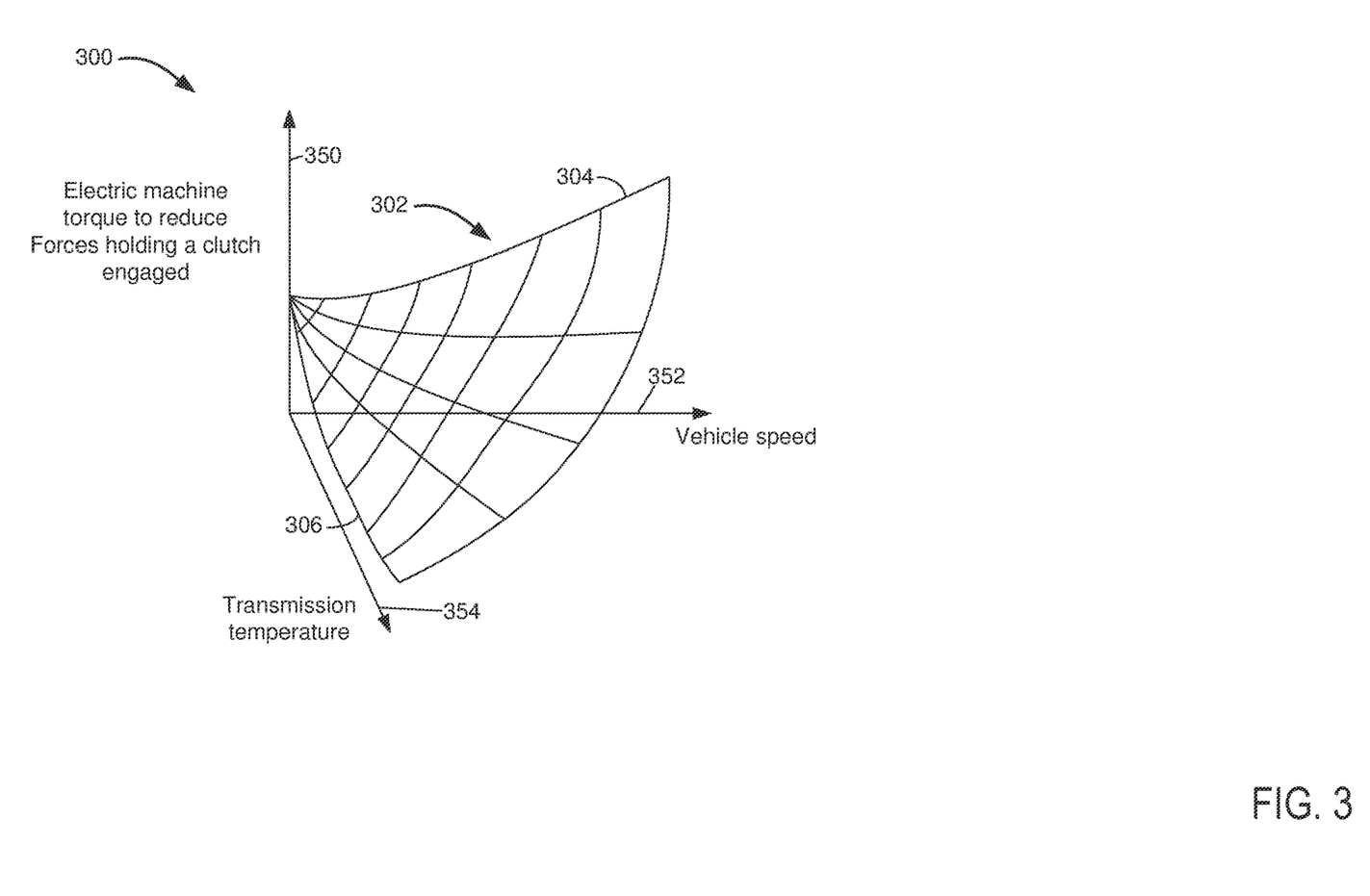
FIG. 3 shows an example mapping of electric machine torque as a function of vehicle speed and transmission temperature.
Figure 4:
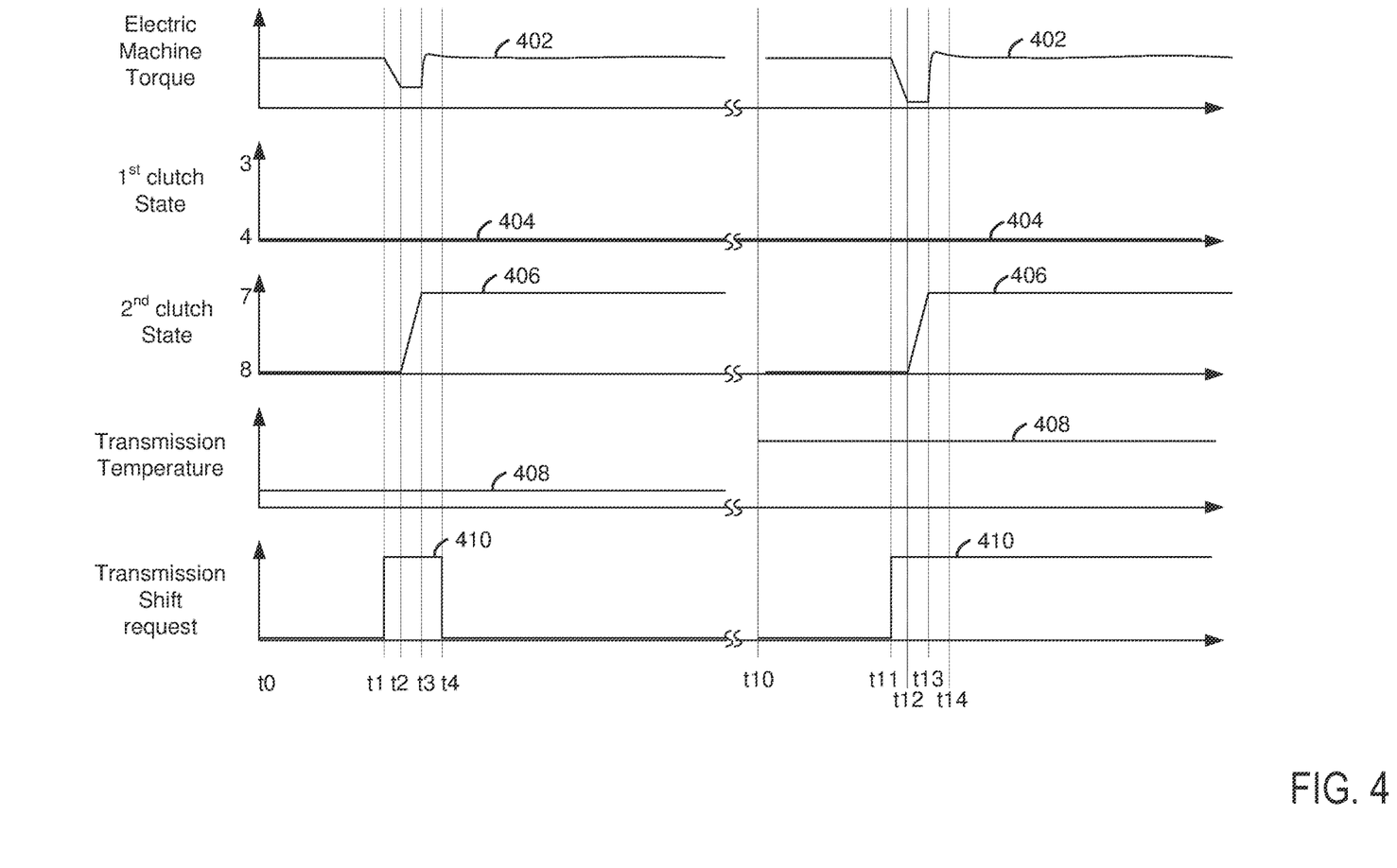
FIG. 4 shows an example transmission gear shifting sequence according to the method of FIG. 5.
Figure 5:
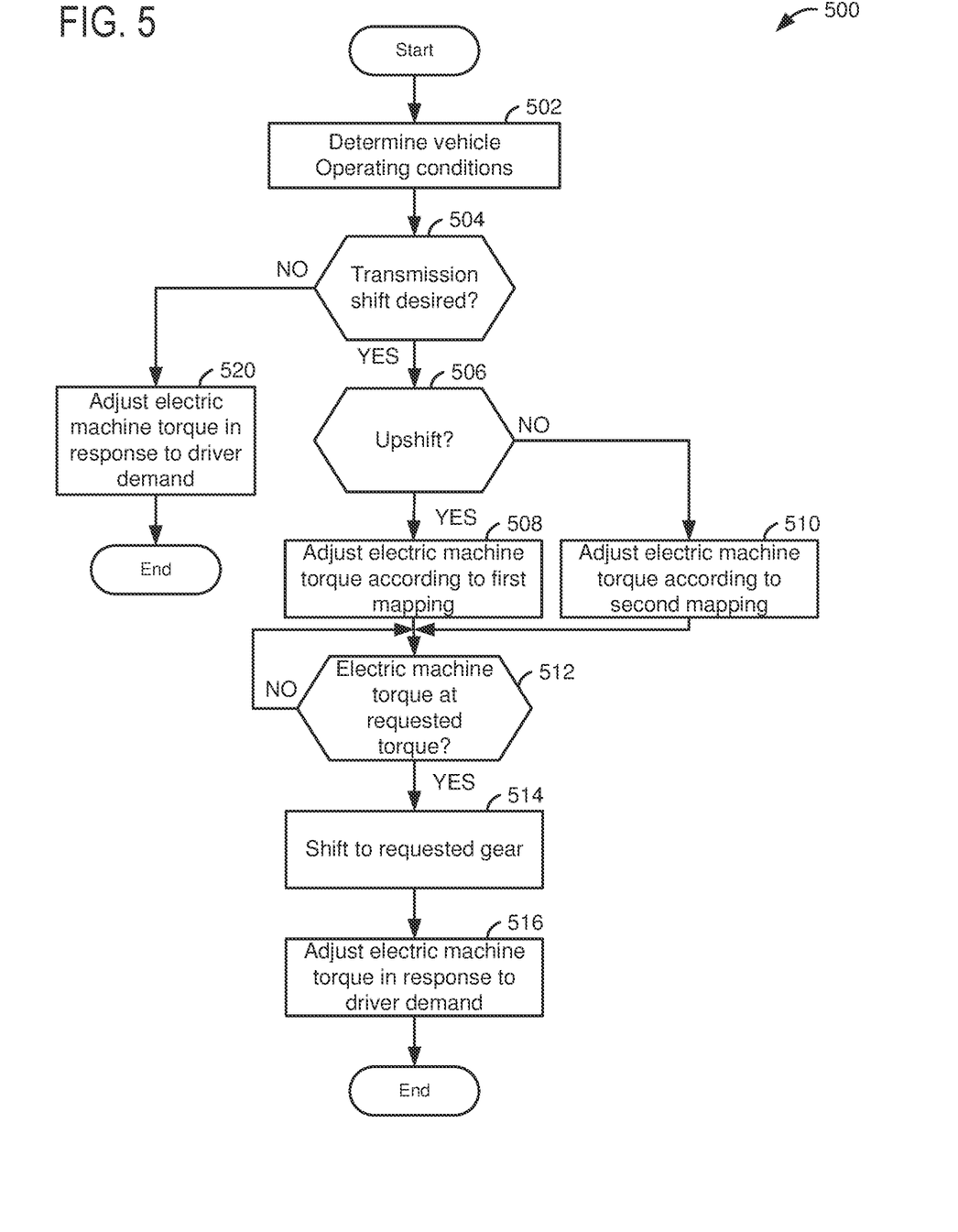
FIG. 5 shows a flowchart of a method for controlling a transmission and an electric machine during a transmission gear shift.

The following description relates to systems and methods for operating a transmission that is directly coupled to an electric machine. The transmission and electric machine may be part of a propulsion system for a vehicle as shown in FIG. 1. The transmission may include gears and mechanical clutches as shown in FIG. 2. The electric machine may be operated in a torque control mode during a requested transmission gear shift according to a mapping as shown in FIG. 3. The transmission and electric machine may be operated as shown in the sequence of FIG. 4 according to the method of FIG. 5. A method for operating an electric machine and a transmission that includes mechanical clutches is shown in FIG. 5.

FIG. 1 illustrates an example vehicle driveline 199 included in vehicle 10. Vehicle 10 includes a front side 110 and a rear side 111. Vehicle 10 includes front wheels 102 and rear wheels 103. Vehicle 10 includes a propulsion source 12 that may selectively provide propulsive effort to rear axle 190. In other examples, the propulsion source may provide propulsive effort to front wheels 102. Propulsion source 12 may be an electric machine (e.g., a motor/generator). Propulsion source 12 is shown mechanically coupled to transmission 19. A detailed view of transmission 19 is shown in FIG. 2. In this example, propulsion source 12 and transmission are incorporated into rear axle 190. However, it should be appreciated that the electric machine and the transmission may drive the front wheels 102 or the front wheels 102 and the rear wheels 103.

Electric energy storage device 16 (e.g., a traction battery or capacitor) may provide electric power to and receive electric power from propulsion source 12. Inverter 14 may convert direct current (DC) from electric energy storage device 16 to alternating current (AC). The AC may be supplied from inverter 14 to propulsion source 12. Alternatively, inverter 14 may convert AC from propulsion source 12 to DC that is supplied to electric energy storage device 16.

In this example, controller 15 is configured to command electric machine 12 to provide a requested speed in a speed control mode or a requested torque in a torque control mode. In torque control mode, torque output of electric machine 12 follows a requested torque while speed of the electric machine 12 is allowed to vary. In speed control mode, a speed of electric machine 12 follows a requested speed and torque of electric machine 12 is allowed to vary. Controller 15 may also shift gears of transmission 19 via actuators as shown in FIG. 2. Controller 15 may also receive a position of a driver demand pedal 100 from driver demand pedal position sensor 108. The driver demand pedal 100 and the driver demand pedal position sensor 108 may react to movement caused by human driver 109. Controller 15 may receive data from sensor 199. Sensors 199 may include, but are not limited to a vehicle speed sensor, a transmission temperature sensor, transmission input shaft speed sensor, transmission output shaft speed sensor, and ambient temperature sensor. Controller 15 includes a processor 15*a* for executing instructions, read-only memory 15*b*, and random access memory 15*c*. Controller 15 may communicate with inverter 14 to request a particular electric machine torque or speed via a controller area network 17. In this example, a single controller 15 is shown, but in other examples several controllers may operate together in a distributed system to perform the methods described herein.

Rear axle 190 may be comprised of two half shafts, including a first or right haft shaft 190*a* and a second or left half shaft 190*b*. The rear axle 190 may be an integrated axle that includes a differential gear set 191. Differential gear set 191 may be open when vehicle 10 is traveling on roads and negotiating curves so that right rear wheel 103*a* may rotate at a different speed than left rear wheel 103*b*. Spatial orientation of vehicle 10 is indicated via axes 175.

Turning now to FIG. 2, a detailed view of one example of transmission 19 is shown. In this example, output shaft 201 of electric machine 12 is coupled to input shaft 204 of transmission 19 via a first gear 202 and a second gear 203. First gear 202 is coupled to electric machine output shaft 201 and second gear 203 is coupled to transmission input shaft 204. Torque that is generated by electric machine 12 may be transmitted to the vehicle's rear wheels 103 as shown in FIG. 1 by way of layshaft 220 and output shaft 230. Output shaft 230 may be coupled to a differential (not shown).

A first mechanical clutch (e.g., a synchronizer) 208 may be coupled to input shaft 204 via splines (not shown) while a third gear 205 and a fourth gear 209 may rotate freely about input shaft 204 when first mechanical clutch 208 is not engaged to either the third gear 205 or the fourth gear 209. First shifting mechanism 206 may be moved by first shift actuator 207 in an axial direction as indicated by arrow 290 to engage and disengage third gear 205 and fourth gear 209. First shift actuator 207 may couple only one of the third gear 205 and the fourth gear 209 to input shaft 204 at a time. Clutch 208 may include teeth, protrusions, or other structures 295 that may interface with teeth or recesses in third gear 205 and fourth gear 209.

Layshaft 220 includes a fifth gear 221 and a sixth gear 222 that rotate together with layshaft 220 so that torque may be transferred from input shaft 204 to output shaft 230. Fifth gear 221 meshes with third gear 205 and seventh gear 232. Sixth gear 222 meshes with fourth gear 209 and eighth gear 234.

A second mechanical clutch (e.g., a synchronizer) 236 may be coupled to output shaft 230 via splines (not shown) while the seventh gear 232 and the eighth gear 234 may rotate freely about output shaft 230 when second mechanical clutch 236 is not engaged to either the seventh gear 232 or the eighth gear 234. Second shifting mechanism 237 (e.g., shift forks) may be moved by second shift actuator 238 in an axial direction as indicated by arrow 292 to engage and disengage seventh gear 232 and eighth gear 234. Second shift actuator 238 may couple only one of the seventh gear 232 and the eighth gear 234 to output shaft 230 at a time. Second mechanical clutch 236 may include teeth, protrusions, or other structures 295 that may interface with teeth or recesses in seventh gear 232 and eighth gear 234.

Transmission 19 may be engaged in a first gear ratio when first clutch 208 locks the fourth gear 209 to the input shaft 204 and when second clutch 236 locks seventh gear 232 to output shaft 230. Transmission 19 may be engaged in a second gear ratio when first clutch 208 locks the fourth gear 209 to the input shaft 204 and when second clutch 236 locks eighth gear 234 to output shaft 230. Transmission 19 may be engaged in a third gear ratio when first clutch 208 locks the third gear 205 to the input shaft 204 and when second clutch 236 locks eighth gear 234 to output shaft 230.

Thus, the system of FIGS. 1 and 2 provides for a propulsion system, comprising: an electric machine; a transmission including a mechanical clutch configured to selectively engage one or more gears of the transmission; and a controller including executable instructions stored in non-transitory memory that cause the controller to adjust a torque of the electric machine to a first mapped torque in response to a request to shift the transmission, the first mapped torque being a torque that reduces a force acting to hold the mechanical clutch in an engaged position. The propulsion system includes where the first mapped torque is a function of a transmission temperature and a vehicle speed. The propulsion system includes where the first mapped torque is also a function of break-in effects of the transmission, and where the brake-in effects include a reduction in torque to rotate components of the transmission. The propulsion system includes where the first mapped torque decreases as the temperature of the transmission increases. The propulsion system includes where the first mapped torque increases as the vehicle speed increases. The propulsion system further comprises a clutch actuator and additional instructions to adjust a position of the clutch actuator in response to the request to shift the transmission. The propulsion system includes where the torque of the electric machine is adjusted to the first mapped torque when the request to shift the transmission is a request to upshift the transmission to a numerically higher gear. The propulsion system further comprises additional executable instructions that cause the controller to adjust the torque of the electric machine to a second mapped torque in response to a request to downshift the transmission to a numerically lower gear.

Referring now to FIG. 3, a plot 300 of a two dimensional mapping of electric machine torque to reduce forces that hold a mechanical clutch engaged to a gear is shown. In this example, the mapping is shown in three dimensions, but in other examples, the dimensions may be extended to 4 or more. The vertical axis 350 represents electric machine torque output to reduce forces holding a mechanical clutch (e.g., clutch 236 if FIG. 2) in an engaged state. The electric machine torque output increases in the direction of the vertical axis arrow. Electric machine torque output at the origin of the plot is zero. Axis 352 represents vehicle speed and vehicle speed increases in the direction of the arrow of axis 352. Axis 354 represents a temperature of the transmission and the temperature of the transmission increases in the direction of the arrow of axis 354.

Plot 300 shows a mesh 302 that indicates how the electric machine torque output is adjusted during a transmission gear shift to reduce forces that hold a mechanical clutch in an engaged state. In particular, the electric machine torque output is decreased as transmission temperature increases as indicated by curve 306. The electric machine torque output increases as vehicle speed is increased. By adjusting the electric machine torque output during a shift to a torque that reduces forces holding the clutch in an engaged state, torque output of the electric machine counteracts friction torque and inertia torque that tends to generate the force that holds the clutch in an engaged state.

Referring now to FIG. 4, an example prophetic operating sequence for a transmission is shown. The sequence of FIG. 4 may be performed according to the method of FIG. 5 in cooperation with the system of FIGS. 1 and 2. Times of interest are indicated via vertical lines at times t0-t14. The plots are aligned in time and occur at the same time. The SS marks along the horizontal axis represent a break in time and the duration of the break may be long or short.

The first plot from the top of FIG. 4 is a plot of output torque of an electric machine (e.g., 12) versus time. The vertical axis represents the output torque of the electric machine and the output torque increases in the direction of the vertical axis arrow. The horizontal axis represents time and time increases from the left side of the plot to the right side of the plot. Trace 402 represents output torque of the electric machine and the output torque of the electric machine is zero at the level of the horizontal axis.

The second plot from the top of FIG. 4 is a plot of an operating state of a first clutch (e.g., 208) of FIG. 2 versus time. The first clutch is engaged to the third gear and has locked the third gear to the input shaft (e.g., 204) when trace 404 is at a level indicated by "3" along the vertical axis. The first clutch is engaged to the fourth gear and has locked the fourth gear to the input shaft when trace 404 is at the level indicated by "4" along the vertical axis. The horizontal axis represents time and time increases from the left side of the plot to the right side of the plot. Trace 404 represents the operating state of the first clutch.

The third plot from the top of FIG. 4 is a plot of an operating state of a second clutch (e.g., 236) of FIG. 2 versus time. The second clutch is engaged to the seventh gear and has locked the seventh gear to the input shaft (e.g., 204) when trace 406 is at a level indicated by "7" along the vertical axis. The second clutch is engaged to the eighth gear and has locked the eighth gear to the input shaft when trace 406 is at the level indicated by "8" along the vertical axis. The horizontal axis represents time and time increases from the left side of the plot to the right side of the plot. Trace 406 represents the operating state of the second clutch.

The fourth plot from the top of FIG. 4 is a plot of a transmission temperature (e.g., a temperature of transmission fluid) versus time. The vertical axis represents the transmission temperature and the transmission temperature increases in the direction of the vertical axis arrow. The horizontal axis represents time and time increases from the left side of the plot to the right side of the plot. Trace 408 represents the transmission temperature.

The fifth plot from the top of FIG. 4 is a plot of an operating state of a transmission shift request versus time. The transmission shift request is asserted when trace 410 is at a higher level near the vertical axis arrow. The transmission shift request is not asserted when trace 410 is at a lower level near the horizontal axis. The horizontal axis represents time and time increases from the left side of the plot to the right side of the plot. Trace 410 represents the transmission shift request operating state.

At time t0, the electric machine torque is at a medium level and the first clutch has locked the fourth transmission gear to the transmission input shaft. The second clutch has locked the eighth transmission gear to the transmission output shaft. The transmission temperature is low and the transmission shift request is not asserted. Such conditions are indicative of the transmission being engaged in first gear ratio. The electric machine torque may be based on the driver demand torque or power.

At time t1, the vehicle has reached a vehicle speed where a request is made to shift from the first gear ratio to a second gear ratio. Therefore, the transmission shift request is asserted. The electric machine torque is unchanged and the operating states of the first and second clutches are unchanged.

Between time t1 and time t2, the output torque of the electric machine is reduced to a torque that is based on the low transmission temperature and the present vehicle speed (not shown). The clutch states are unchanged and the transmission temperature is unchanged.

At time t2, the electric machine reaches the torque that reduces forces acting to hold the second clutch engaged to the eighth transmission gear. This allows the second shift actuator (e.g., 238) to adjust the position of the second shifting mechanism (e.g., 237) to disengage the second clutch (e.g., 236) from the eighth gear (e.g., 234) and engage and lock the seventh gear (e.g., 232) to the transmission output shaft (e.g., 230). The second clutch state begins to change state and the state of the first clutch remains unchanged. The electric machine torque is held at its previous non-zero value and the transmission shift request remains asserted.

At time t3, the second shift actuator has engaged and locked the seventh gear to the transmission output shaft. The first clutch state is unchanged and the transmission temperature is unchanged. The transmission shift request remains asserted and the electric machine torque begins to increase toward a torque that is based on the driver demand. The transmission is engaged with a new gear ratio.

At time t4, the electric machine torque is returned to a torque that is requested based on driver demand. In this example, the driver demand torque is an electric machine torque request rather than a wheel torque request, but in other examples, the electric machine torque may be adjusted according to a requested wheel torque. The operating states of the first and second clutches are unchanged and the transmission shift request is withdrawn.

At time t10, the electric machine torque is at a medium level and the first clutch has locked the fourth transmission gear to the transmission input shaft. The second clutch has locked the eighth transmission gear to the transmission output shaft. The transmission temperature is at a higher level and the transmission shift request is not asserted. Such conditions are indicative of the transmission being engaged in a first gear ratio. The electric machine torque may be based on the driver demand torque or power.

At time t11, the vehicle has reached a vehicle speed where a request is made to shift from the first gear ratio to a second gear ratio. Therefore, the transmission shift request is asserted. The electric machine torque is unchanged and the operating states of the first and second clutches are unchanged.

Between time t11 and time t12, the output torque of the electric machine is reduced to a torque that is based on the higher transmission temperature and the present vehicle speed (not shown). The electric machine is adjusted to a lower torque between times t11 and t12 as compared to the torque the electric machine is adjusted to between times t1 and t2. The electric machine is adjusted to a lower torque because less electric machine torque is needed to reduce forces acting to hold the second clutch engaged to the eighth transmission gear. The clutch states are unchanged and the transmission temperature is unchanged.

At time t12, the electric machine reaches the torque that reduces forces acting to hold the second clutch engaged to the eighth transmission gear. This allows the second shift actuator (e.g., 238) to adjust the position of the second shifting mechanism (e.g., 237) to disengage the second clutch (e.g., 236) from the eighth gear (e.g., 234) and engage and lock the seventh gear (e.g., 232) to the transmission output shaft (e.g., 230). The second clutch state begins to change state and the state of the first clutch remains unchanged. The electric machine torque is held at its previous non-zero value and the transmission shift request remains asserted.

At time t13, the second shift actuator has engaged and locked the seventh gear to the transmission output shaft. The first clutch state is unchanged and the transmission temperature is unchanged. The transmission shift request remains asserted and the electric machine torque begins to increase toward a torque that is based on the driver demand. The transmission is engaged with a new gear ratio.

At time t14, the electric machine torque is returned to a torque that is requested based on driver demand. In this example, the driver demand torque is an electric machine torque request rather than a wheel torque request, but in other examples, the electric machine torque may be adjusted according to a requested wheel torque. The operating states of the first and second clutches are unchanged and the transmission shift request is withdrawn.

In this way, a torque of an electric machine providing propulsive effort to propel a vehicle may be adjusted during a transmission gear shift to allow a transmission gear shift actuator to disengage a clutch from an engaged gear. The electric machine torque may be adjusted as a function of transmission temperature to compensate for forces acting to keep the clutch engaged with the gear that may be influenced by transmission temperature.

Referring now to FIG. 5, an example method for shifting a transmission and operating an electric machine that provides propulsive effort to a driveline is shown. Method 500 may be at least partially implemented as executable instructions stored in controller memory in the system of FIGS. 1 and 2. Further, method 500 may include actions taken in the physical world to transform an operating state of the system of FIGS. 1 and 2. Additionally, method 500 may provide the operating sequence shown in FIG. 4 and method 500 may be performed a vehicle is being propelled via an electric machine.

At 502, method 500 determines vehicle operating conditions. Vehicle operating conditions may include, but are not limited to driver demand torque/power, vehicle speed, and transmission temperature. The vehicle operating conditions may be determined from the vehicle's sensors. The driver demand may be determined based on a position of the driver demand pedal. Method 500 proceeds to 504.

At 504, method 500 judges if a transmission gear shift is desired. Method 500 may judge if a transmission gear shift is desired based on shift schedules for upshifting and downshifting the transmission. In one example, method 500 may request a gear shift based on vehicle speed and driver demand torque/power. If method 500 judges that present vehicle conditions call for a transmission gear shift, the answer is yes and method 500 proceeds to 506. Otherwise, the answer is no and method 500 proceeds to 520.

At 520, method 500 adjusts a torque or power output of the electric machine (e.g., 12) based on the driver demand torque/power. For example, if the driver demand is for 100 Newton-meters (Nm) output of the electric machine, method 500 commands the electric machine to produce 100 Nm in a torque control mode. If the driver demand is for 50 Nm of wheel torque, method 500 requests an electric machine torque that generates 50 Nm at the wheels. Method 500 proceeds to exit.

At 506, method 500 judges if the requested transmission gear shift is an upshift. Method 500 may judge that the requested transmission gear shift is an upshift if the presently engaged transmission gear is a lower gear than the requested transmission gear. The requested transmission gear may be output from a shift schedule that is based on vehicle speed and driver demand torque. If method 500 judges that the presently requested transmission gear shift is an upshift, the answer is yes and method 500 proceeds to 508. Otherwise, the answer is no and method 500 proceeds to 510.

At 508, method 500 adjusts torque output from the electric machine based on a first mapping. The first mapping may output non-zero torque values. The first mapping may output a requested electric machine torque given a transmission temperature and a vehicle speed. In other examples, the first mapping may output the requested electric machine torque given a transmission temperature, a vehicle speed, and a numerical value that represents transmission break-in conditions. Transmission break-in conditions may include but are not limited to torque to turn transmission components, variation of force that holds a clutch engaged with a gear, and actuator degradation. The transmission break-in condition numerical value may be estimated based on a distance the vehicle has traveled, transmission temperatures while the vehicle is being operated, and other operating conditions. The first mapping may be realized via a function call or via referencing one or more tables that are stored in controller memory and that are populated with empirically or modeled values. The torque values that are output of the first mapping may reduce forces that act or operate to hold a clutch engaged with a gear. Method 500 commands the electric machine to output the requested torque. Method 500 proceeds to 512.

At 510, method 500 adjusts torque output from the electric machine based on a second mapping. The second mapping may output non-zero torque values. The second mapping may output a requested electric machine torque given a transmission temperature and a vehicle speed. In other examples, the second mapping may output the requested electric machine torque given a transmission temperature, a vehicle speed, and a numerical value that represents transmission break-in conditions. The second mapping may be realized via a function call or via referencing one or more tables that are stored in controller memory and that are populated with empirically or modeled values. The torque values that are output of the second mapping may reduce forces that act or operate to hold a clutch engaged with a gear. Torque values output from the second torque map may be different from torque values output from the first torque map. Method 500 commands the electric machine to output the requested torque. Method 500 proceeds to 512.

At 512, method 500 judges if the electric machine is outputting the requested torque. If so, the answer is yes and method 500 proceeds to 514. Otherwise, the answer is no and method 500 continues to command the electric machine to the requested torque.

At 514, method 500 shifts the transmission into the requested gear. In one example, method 500 commands one or more actuators to move one or more clutches to engage the requested gear ratio. Note that to engage the requested gear ratio, the transmission clutches may engage and couple one or more transmission gears to the transmission input shaft and/or transmission output shaft. Method 500 proceeds to 516.

At 516, method 500 commands the electric machine to a torque to deliver the driver demand torque/power. Method 500 proceeds to exit.

In this way, torque of an electric machine may be adjusted in response to a request to a request to shift transmission gears so that an actuator may have sufficient force to disengage an engaged gear and engage a requested gear. Maps of electric machine torques during transmission gear shifts may be provided for transmission gear upshifts and downshifts.

Thus, the method of FIG. 5 provides for adjusting a torque of an electric machine responsive to a driver demand via a controller while not shifting a gear of the transmission; and adjusting the torque of the electric machine via the controller responsive to a gear shift request, the torque adjusted according to a torque map that reduces forces that act to keep a clutch engaged to a gear in response to the gear shift request. The method includes where the torque map adjusts the torque of the electric machine according to a temperature of the transmission. The method includes where the torque map adjusts the torque of the electric machine according to a vehicle speed. The method includes where the torque map adjusts the torque of the electric machine according to a transmission break-in effects. The method further comprises adjusting a position of a mechanical clutch in response to the gear shift request. The method includes where the position of the mechanical clutch is adjusted to release a first gear and engage a second gear. The method includes where an output shaft of the electric machine is coupled to an input shaft of the transmission via a gear and without a clutch.

The method of FIG. 5 also provides for a method for shifting a transmission, comprising: adjusting a torque of an electric machine responsive to a driver demand via a controller while not shifting a mechanical clutch of the transmission; adjusting the torque of the electric machine via the controller responsive to a first torque map that reduces forces that act to keep a clutch engaged to a first gear in response to a gear upshift request; and adjusting the torque of the electric machine via the controller responsive to a second torque map that reduces forces that act to keep the clutch engaged to a second gear in response to a gear downshift request. The method includes where values in the first torque map and values in the second torque map change according to a transmission temperature. The method includes where the values in the first torque map and values in the second torque map change according to vehicle speed. The method includes where the values in the first torque map and values in the second torque map reduce the torque of the electric machine as a distance that a vehicle that includes the transmission is driven increases. The method includes where an output shaft of the electric machine is directly coupled to the transmission via a gear and without a clutch.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for shifting a transmission, comprising:
adjusting a torque of an electric machine responsive to a driver demand via a controller while not shifting a gear of the transmission, wherein the electric machine is the only electric machine coupled to the transmission; and
adjusting the torque of the electric machine via the controller responsive to a gear shift request, the torque adjusted according to a torque map that reduces forces that act to keep a clutch engaged to a gear in response to the gear shift request, where the torque map adjusts the torque of the electric machine according to a temperature of the transmission, including: at a lower transmission temperature, the torque of the electric machine is temporarily reduced from the torque responsive to the driver demand to a first torque that reduces the forces, and, at a higher temperature, the torque of the electric machine is temporarily reduced from the torque responsive to the driver demand to a second torque, lower than the first torque, that reduces the forces.

2. The method of claim 1, where the torque map adjusts the torque of the electric machine according to a vehicle speed.

3. The method of claim 2, where the torque map adjusts the torque of the electric machine according to a transmission break-in effects.

4. The method of claim 1, further comprising adjusting a position of a mechanical clutch in response to the gear shift request.

5. The method of claim 4, where the position of the mechanical clutch is adjusted to release a first gear and engage a second gear.

6. The method of claim 1, where an output shaft of the electric machine is coupled to an input shaft of the transmission via a gear and without a clutch.

7. A propulsion system, comprising:
an electric machine configured as the only torque source of the propulsion system;
a transmission including a mechanical clutch configured to selectively engage one or more gears of the transmission; and
a controller including executable instructions stored in non-transitory memory that cause the controller to adjust a torque of the electric machine to a first mapped torque in response to a request to upshift the transmission to a numerically higher gear, the first mapped torque being a torque that reduces a force acting to hold the mechanical clutch in an engaged position, where the first mapped torque is a function of a transmission temperature and a vehicle speed, and where the first mapped torque decreases as the transmission temperature increases.

8. The propulsion system of claim 7, where the first mapped torque is also a function of break-in effects of the transmission, and where the brake-in effects include a reduction in torque to rotate components of the transmission.

9. The propulsion system of claim 7, where the first mapped torque increases as the vehicle speed increases.

10. The propulsion system of claim 7, further comprising a clutch actuator and additional instructions to adjust a position of the clutch actuator in response to the request to shift the transmission.

11. The propulsion system of claim 7, further comprising additional executable instructions that cause the controller to adjust the torque of the electric machine to a second mapped torque in response to a request to downshift the transmission to a numerically lower gear.

12. A method for shifting a transmission, comprising:
adjusting a torque of an electric machine responsive to a driver demand via a controller while not shifting a mechanical clutch of the transmission, wherein the electric machine is the only electric machine of a powertrain comprising the transmission and the electric machine;
adjusting the torque of the electric machine via the controller responsive to a first torque map that reduces forces that act to keep a clutch engaged to a first gear in response to a gear upshift request; and
adjusting the torque of the electric machine via the controller responsive to a second torque map that reduces forces that act to keep the clutch engaged to a second gear in response to a gear downshift request, where torque values output from the second torque map are different from torque values output from the first torque map.

13. The method of claim 12, where the torque values in the first torque map and the torque values in the second torque map change according to a transmission temperature.

14. The method of claim 13, where the torque values in the first torque map and the torque values in the second torque map change according to vehicle speed.

15. The method of claim 12, where the torque values in the first torque map and the torque values in the second torque map reduce the torque of the electric machine as a distance that a vehicle that includes the transmission is driven increases.

16. The method of claim 12, where an output shaft of the electric machine is directly coupled to the transmission via a gear and without a clutch.

* * * * *